United States Patent [19]

Kilgus et al.

[11] Patent Number: 5,511,893
[45] Date of Patent: Apr. 30, 1996

[54] CONNECTION OF A SHAFT WITH AN ELEMENT ON PARTICULAR THE SHAFT OF A ROTARY SETTING MEMBER WITH A SETTING WHEEL

[75] Inventors: Albert Kilgus, Stuttgart; Rainer Debler, Ostfildern, both of Germany

[73] Assignee: Eastman Kodak Company, Rochester, N.Y.

[21] Appl. No.: 1,992

[22] Filed: Mar. 30, 1993

[51] Int. Cl.⁶ .......................... G05G 5/00; H01C 10/00; F16B 17/00
[52] U.S. Cl. .......................... 403/294; 403/292; 403/361; 338/163
[58] Field of Search .......................... 403/289, 290, 403/344, 383, 361, 360, 292, 294, 243; 74/439, 450, 448; 474/95, 96, 902; 338/163

[56] References Cited

U.S. PATENT DOCUMENTS

| 727,707 | 5/1903 | Stauffer et al. | 403/344 |
| 799,963 | 9/1905 | Baldwin | 403/344 |
| 3,512,113 | 5/1970 | Kirkendall | 338/163 |
| 4,506,559 | 3/1985 | Francke et al. | 403/344 |
| 4,834,573 | 5/1989 | Asano et al. | 403/344 |
| 5,057,058 | 10/1991 | Crudup | 474/95 |
| 5,107,243 | 4/1992 | Maeda | 338/163 |

FOREIGN PATENT DOCUMENTS

| 328905 | 1/1903 | France . | |
| 112640 | 8/1900 | Germany | 474/96 |
| 836372 | 4/1952 | Germany . | |
| 1732715 | 10/1956 | Germany . | |
| 2345333 | 9/1973 | Germany . | |
| 8601266 | 2/1986 | WIPO . | |

Primary Examiner—Randolph A. Reese
Assistant Examiner—Anthony Knight
Attorney, Agent, or Firm—Frank Pincelli

[57] ABSTRACT

Connection of a shaft with an element, in particular the shaft of a rotary setting element with a seating wheel, said connection comprising a recess provided for setting said shaft in said element and an opening by which said recess is connected with the outer edge of the element and through which the connection can be effected by relative movement of the shaft and the element transversely to the axis of said shaft, characterized in that a second element is inserted into the opening in a direction transversely to the axis of the shaft and that interlocking means provided on the first element and the second element cooperate to fix the second element in the opening of the first element.

7 Claims, 2 Drawing Sheets

CONNECTION OF A SHAFT WITH AN ELEMENT ON PARTICULAR THE SHAFT OF A ROTARY SETTING MEMBER WITH A SETTING WHEEL

FIELD OF THE INVENTION

The invention relates to a connection of a shaft with an element, in particular the shaft of a rotary setting member with a setting wheel, said connection comprising a recess provided for seating the shaft in said element and an opening by which said recess is connected to the outer edge of said element and through which the connection can be effected by relative movement of the shaft and the element transversely to the axis of said shaft.

BACKGROUND INFORMATION

Connections of this type are as a rule used if lack of space or special spatial or constructional circumstances render it difficult or impossible to bring the shaft and the recess forming its seat or bearing into engagement by a relative movement in the axial direction (relative to the axis of the shaft). If there is not sufficient space available a given shaft length can prevent the shaft from being inserted by axial shifting into a recess which serves as a bearing in a bearing block or plate. If the first element including such a recess is a wheel which is to be brought into position on a shaft lack of space or special reasons of manufacture or assembly may also forbid shifting of the wheel onto the shaft from the shaft end.

Problems To Be Solved By The Invention

It is the object of the invention to provide a connection of the generic type which is adapted for universal use and particularly advantageous in cases where a setting wheel has to be connected with the shaft of a rotary setting member.

SUMMARY OF THE INVENTION

According to the invention this object is attained with a connection of the aforementioned type in that a second element is inserted into the opening in a direction transverse to the axis of the shaft and in that interlocking means provided on said first and said second element cooperate to fix the second element in the opening of the first element.

Since, in accordance with the invention, a second element is provided which can be inserted into the opening of the first element, the first element whose outer contour was initially interrupted by the opening extending up to its edge, can be given a desired shape, e.g. a closed shape, by the insertion of the second element.

If the connection is intended for linking a shaft to a wheel the opening in the wheel portion, which forms the first element and includes the recess for the shaft, and the insert which forms the second element, can be shaped in a particularly advantageous manner such that when the connection is completed, the wheel connected with the shaft has a closed interrupted contour and/or exhibits the desired wheel shape.

If the second element is for example a wheel segment by which a setting wheel is completed, such wheel segment may be made from a material differing in color from the rest of the wheel and thus serving at the same time as a colored setting mark on the circumference of the wheel.

DESCRIPTION OF THE PREFERRED EMBODIMENT

Figure 1:
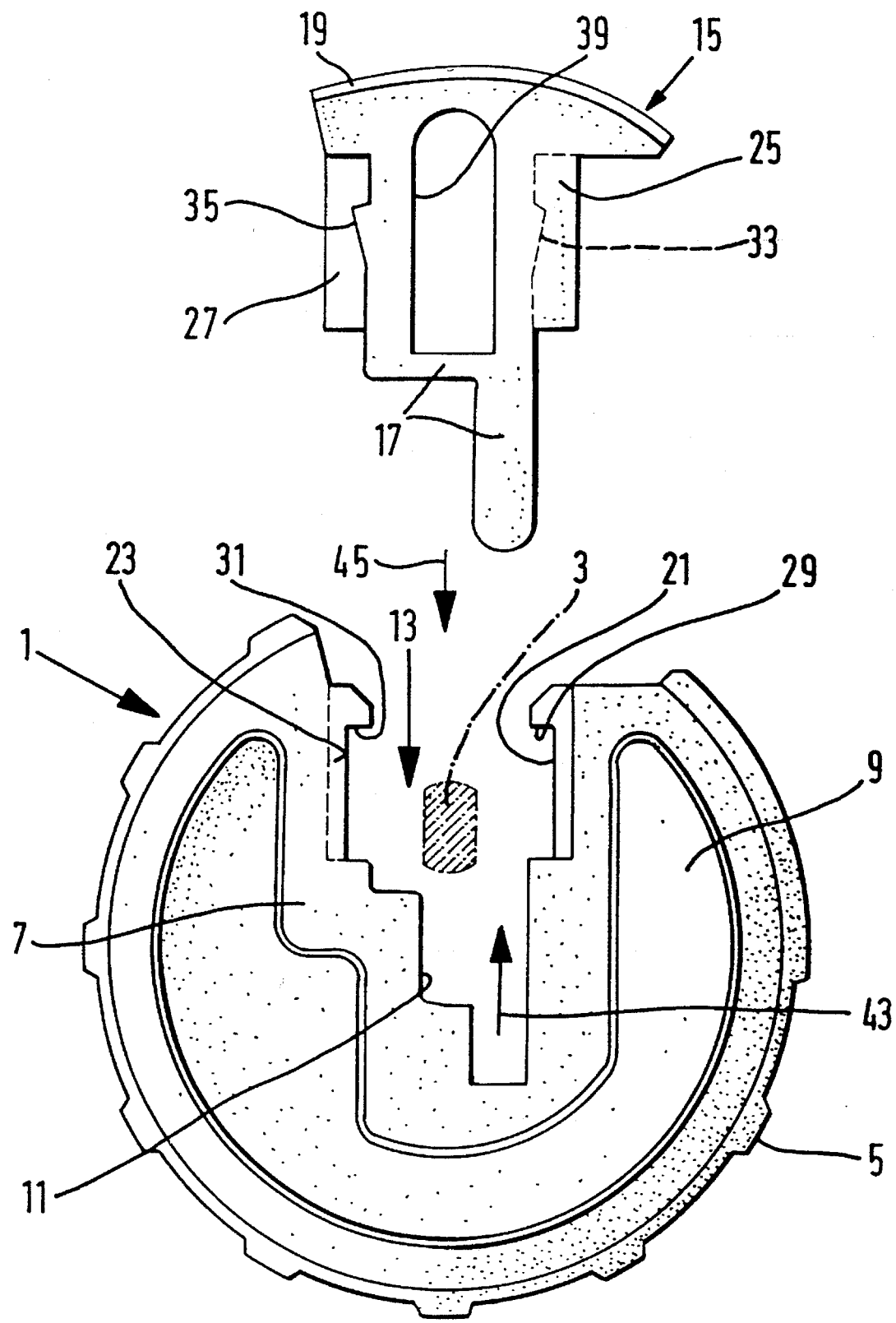
FIG. 1 shows a front view of a setting wheel adapted for the connection, with a noncircular portion of a shaft illustrated in section and the elements not yet connected.
Figure 2:
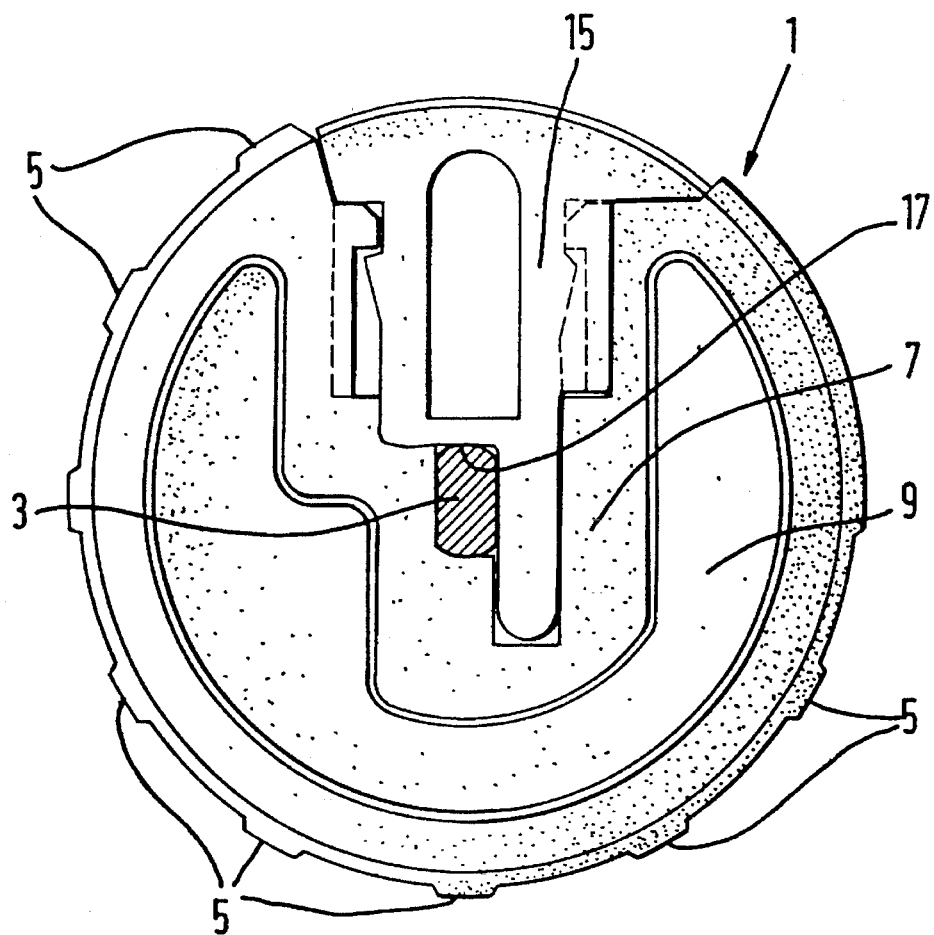
FIG. 2 shows a front view corresponding to FIG. 1, with the elements connected.
Figure 3:
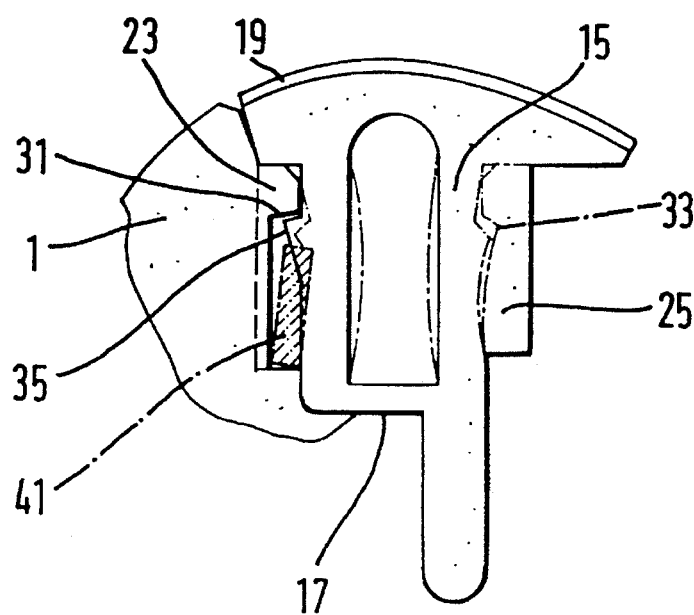
FIG. 3 shows a front view of a circumferential section of the setting wheel according to FIGS. 1 and 2, with parts broken away.

FIGS. 1 to 3 show the connection according to the invention with reference to a setting wheel 1 which is to be mounted on a non-circular portion of a shaft 3. In the embodiment illustrated shaft 3 is the setting shaft of an adjusting potentiometer (not illustrated) which serves as a rotary setting member. During the so-called surface mounting the potentiometer is attached to a printed circuit board (not illustrated) on the upper surface facing away from the conductors such that the shaft 3 extends in parallel with the circuit board and setting wheel 1 is received with its rim in a slot of said circuit board. For connecting the circuit board with the potentiometer, the solder pins thereof are plugged through the circuit board and are then electrically connected with the conductor paths on the lower side of the circuit board along with the free ends of the solder pins is moved across a solder bath. This soldering operation must be carried out before the setting wheel is positioned on shaft 3 of the potentiometer because otherwise the setting wheel would be immersed in the solder bath with its rim projecting from the slot of the lower side of the circuit board. A setting wheel made from plastic for example would thus be damaged in that the portion immersed would melt.

If, however, the potentiometer is connected with the circuit board without setting wheel 1 the setting wheel 1 cannot be axially mounted on shaft 3 if the rim of the setting wheel is to extend through the slot of the circuit board as in the case of the embodiment described. In such cases, therefore, a connection of setting wheel 1 with shaft 3 can only be effected by a radial movement of said wheel relative to the axis of the shaft.

In the case of the embodiment setting wheel 1 is a center disk wheel molded from plastic and provided on part of its circumference with projections 5 forming a knurled surface which facilitates manual rotation. Between its rim featuring the projections 5 and an adjacent inner hub portion 7, the wheel disk has a portion 9 which is thinner than the rest and extends over the majority of the circumference of the wheel. Hub portion 7 includes a recess 11 in the central portion of wheel 1, which serves to seat the noncircular shaft 3. Recess 11 is part of an opening 13 which extends to the periphery of the wheel so that wheel 1 is open on part of its circumference. With the exception of recess 11, the entire opening 13 can be closed by a wedge 15 which is molded from plastic and shaped such that when it is placed in the opening 13 the circumference of setting wheel 1 is at least substantially completed and a closed wheel thus formed. Wedge portion 17 which is located close to recess 11 when the wedge is inserted is shaped like recess 11 such that it fits the noncircular portion of shaft 3 positioned in recess 11 and, in cooperation with the edge of recess 11, connects the shaft with setting wheel 3 in a manner preventing rotation.

In the case of the embodiment illustrated the thickness of wedge 15 corresponds to that of hub portion 7 of wheel 1.

In an end section 19 facing radially outwards with respect to the axis of shaft 3, wedge 15 forms an arcuate section. In the areas close to the circumference of the wheel the edges of opening 13 are provided with strips 21 and 23 which are axially offset relative to each other (with respect to the axis of shaft 3) such that the outer surface of one strip is flush with the outer surface of hub portion 7 on one side of the wheel and the outer strip is flush with the outer surface of hub portion 7 on the other side of the wheel. The strips 21 and 23 thus provide facing inner step surfaces for mounting the facing inner surfaces of lateral wings 25 and 27 respectively integrally formed with wedge 15 in a position complementary to that of the strips 21, 23 of wheel 1. In order to safely prevent wedge 15 from being rotated out of the plane of wheel 1 about an axis extending radially with respect to shaft 3 even if wheel 1 is very thin, the end faces of wheel 1, which in the area of the strips 21 and 23 face the end faces of wedge 15 and rest against said faces, may form acute angles with the step surfaces formed by the strips 21 and 23 so that when the end faces of wedge 15 are inclined accordingly, wedge 15 is locked with wheel 1.

The strips 21 and 23 have projections 29 and 31 respectively which are brought into locking engagement with locking noses 33 and 35 respectively of wedge 15 when the wedge is inserted into opening 13.

The locking noses 33 and 35 respectively can override the rear sides of the projections 29, 31 in that wedge 15 is resilient in the range of noses 33, 35. The resiliency is brought about in that wedge 15 has in its central area a cut-out 39 which allows it to be deformed in the adjacent areas in the manner indicated in FIG. 3 in dash-dotted lines. This also allows wedge 15 to be removed after insertion by means of a tool such as a screwdriver blade 41, shown in section in FIG. 3, which is inserted between locking nose 35 and strip 23 to urge nose 35 out of engagement with projection 31.

The connection between setting wheel 1 and shaft 3 can be effected in that wheel 1 is moved transversely to the axis of shaft 3 as indicated by the arrow 43 in FIG. 1. When shaft 3 has been positioned by this movement in the recess 11 of hub portion 7 of wheel 1 wedge 15 is inserted by an opposite insertion movement transversely to the axis of shaft 3—see arrow 45 in FIG. 1—into opening 13, with the locking noses 33 and 35 engaging the projections 29 and 31 respectively. This position is shown in FIG. 2 which depicts the completed connection in which shaft 3 is fixed against rotation in recess 11 of hub portion 7 of the wheel.

Setting wheel 1 can be axially fixed on shaft 3 in various manners. In the case of a setting wheel that is fixed on the shaft of a potentiometer mounted on a printed circuit board, the edges of the slot of the circuit board in which setting wheel 1 is received, serve as abutments by which axial movement of the wheel is limited. Alternatively, the shaft section seated in hub portion 7 of wheel 1 could be a tapered section in the form of an annular grove.

Rather than connecting shaft 3 and setting wheel 1 in a manner preventing rotation, a wheel could also be rotatably mounted on the associated shaft. In such a case the recess in hub portion 7 of wheel 1 and the adjacent portion 17 of wedge 15 would have to be adapted to the circular shape of the shaft.

Wedge 15 may consist of a material which differs in color from the material of wheel 1 so that wedge 15 forms a colored section on the circumference of wheel 1, which may serve as a setting mark or the like.

The above description and the drawing are restricted to features which are essential to the disclosure of an embodiment of the invention. Features not disclosed in the description and the drawing and not mentioned in the claims also serve if necessary to define the subject matter of the application.

We claim:

1. Connection of a shaft with an element, in particular, the shaft of a rotary setting member with a disk-shaped setting wheel, said setting wheel having a recess adapted to receive said shaft of said rotary setting member, said recess being part of an opening by which said recess is connected with the outer edge of the shaft of the rotary setting member and through which the connection can be affected by relative movement of the shaft and the rotary setting member transversely to the axis of said shaft, characterized in that a wedge member is inserted into the opening in a direction transversely to the axis of the shaft, interlocking means are provided on the setting wheel and on the wedge member for fixing the wedge member in the opening of the setting wheel, wherein the interlocking means comprises inwardly extending projections contained within the opening and outwardly extending locking noses on the wedge member.

2. A disk-shaped connection according to claim 1, characterized in that the shape and dimensions of the wedge member are adapted to those of the opening and the outer contour of the setting member such that when the wedge member is inserted, the latter is completed at least in the area of the outer edge and providing a substantially closed shape.

3. A connection according to claim 2, characterized in that the setting wheel is designed as a wheel and the closed shape is the outer contour of the wheel.

4. A connection according to claim 1, characterized in that the interlocking means includes means which are provided at the edges of the opening of the setting wheel and the associated edge areas of the wedge member are locking the first setting wheel with the edge member.

5. A connection according to claim 4, characterized in that the wedge member of the setting wheel which can be inserted into the opening and the interlocking means comprising a resilient locking nose provided on the wall portions of the wedge member and adapted to cooperate with projections provided in the setting wheel.

6. A connection according to claim 1, characterized in that the setting wheel and/or wedge member have a cutout in the range of the interlocking means, said cutout allowing the setting wheel and/or the wedge member to be resiliently formed and the interlocking means to be unlocked.

7. A disk-shaped setting wheel for connecting a shaft of a rotary setting member, said setting wheel having a hub portion having a recess designed to receive the shaft of the rotary setting member, said recess being part of an opening by which said recess is connected with the outer edge of said shaft and through which connection can be affected by relative movement of the shaft and the setting wheel transversely to the axis of the shaft, characterized in that the setting wheel further includes a wedge member for insertion into the opening in a direction transversely to the axis of the shaft, said setting wheel having interlocking means provided on the hub and the wedge member for fixing the wedge member into the opening of the hub, wherein the interlocking means comprises inwardly extending projections contained within the opening and outwardly extending locking noses on the wedge member.

* * * * *

UNITED STATES PATENT AND TRADEMARK OFFICE
CERTIFICATE OF CORRECTION

PATENT NO. : 5,511,893
DATED : April 30, 1996
INVENTOR(S) : Albert Kilgus, et. al.

It is certified that error appears in the above-indentified patent and that said Letters Patent is hereby corrected as shown below:

Title page, item [54] and col. 1, line 2, delete "ON" and insert --IN--;
Column 4, claim 2, line 24, delete "disk-shaped".

Signed and Sealed this

Nineteenth Day of November, 1996

*Attest:*

BRUCE LEHMAN

*Attesting Officer*     *Commissioner of Patents and Trademarks*